US005946912A

United States Patent [19]

Hung

[11] Patent Number: 5,946,912

[45] Date of Patent: Sep. 7, 1999

[54] OIL RETURN LOOP OF A HYDRAULIC CYLINDER

[76] Inventor: Michael Hung, 9-16, Nan Kan Hsia, Nan Kan, Lu Chu Hsiang, Taiwan

[21] Appl. No.: 09/085,056

[22] Filed: May 27, 1998

[51] Int. Cl.[6] .......... F16D 31/02

[52] U.S. Cl. .......... 60/480; 92/162 R; 92/164

[58] Field of Search .......... 60/477, 480; 92/162 R, 92/163, 164

[56] References Cited

U.S. PATENT DOCUMENTS

| | | | |
|---|---|---|---|
| 2,453,350 | 11/1948 | Stegeman | 60/480 X |
| 2,761,425 | 9/1956 | Bertsch et al. | 92/163 X |
| 3,567,240 | 3/1971 | Brassington | 60/480 X |
| 3,818,805 | 6/1974 | Johansson | 92/162 R X |

FOREIGN PATENT DOCUMENTS

| | | | |
|---|---|---|---|
| 305023 | 1/1933 | Italy | 60/480 |

*Primary Examiner*—Hoang Nguyen
*Attorney, Agent, or Firm*—Wenderoth, Lind & Ponack, L.L.P.

[57] ABSTRACT

An oil return loop of a hydraulic cylinder which includes a plurality of equiangularly spaced V-shaped oil return grooves at the inside wall of an inner cylinder of the hydraulic cylinder for guiding saturated hydraulic oil to the outer cylinder of the hydraulic cylinder when the piston rod of the hydraulic cylinder is extended out. Each of V-shaped oil return grooves has two smoothly arched chamfered edges respectively disposed at connecting areas between the V-shaped oil return grooves and the inside wall of the inner cylinder to facilitate movement of the oil seal ring of the piston of the piston rod over the oil return loop.

4 Claims, 2 Drawing Sheets

OIL RETURN LOOP OF A HYDRAULIC CYLINDER

BACKGROUND OF THE INVENTION (a) Field of the Invention

The present invention relates to a hydraulic cylinder, and more specifically to the oil return loop of a hydraulic cylinder which facilitates the movement of the oil seal ring with the piston, so that the service life of the oil seal ring is greatly prolonged.

(b) Description of the Prior Art

A regular hydraulic cylinder has a safety oil release hole between the inner cylinder and the outer cylinder. Through the safety oil release hole, saturated hydraulic oil flows from the inner cylinder to the outer cylinder when the piston is extended out of the inner cylinder, so as to prevent an explosion of the hydraulic cylinder due to an overload. U.S. Pat. No. 4,077,608 discloses a design of safety oil return loop, in which an oil return groove is provided at the top of the piston. When the piston is moved with the piston rod to the top end of the inner cylinder, the oil return groove imparts a passage to guide saturated oil from the inner cylinder to the outer cylinder. However, because the oil seal ring which is mounted around the piston tends to be deformed to block the oil return groove when the piston is moved to the top end of the inner cylinder, saturated hydraulic oil cannot be smoothly guided out of the inner cylinder to the outer cylinder.

SUMMARY OF THE INVENTION

The present invention eliminates the aforesaid problem. According to the present invention, a plurality of equiangularly spaced V-shaped oil return grooves are provided at the inside wall of the inner cylinder near its top end for guiding saturated hydraulic oil out of the inner cylinder to the outer cylinder when the piston is moved with the piston rod to the top end of the inner cylinder. The V-shaped oil return grooves each having two smoothly arched chamfered edges, which facilitate the movement of the oil seal ring with the piston, without causing much resistance to the oil seal ring.

DETAILED DESCRIPTION OF THE PREFERRED EMBODIMENT

Figure 1:
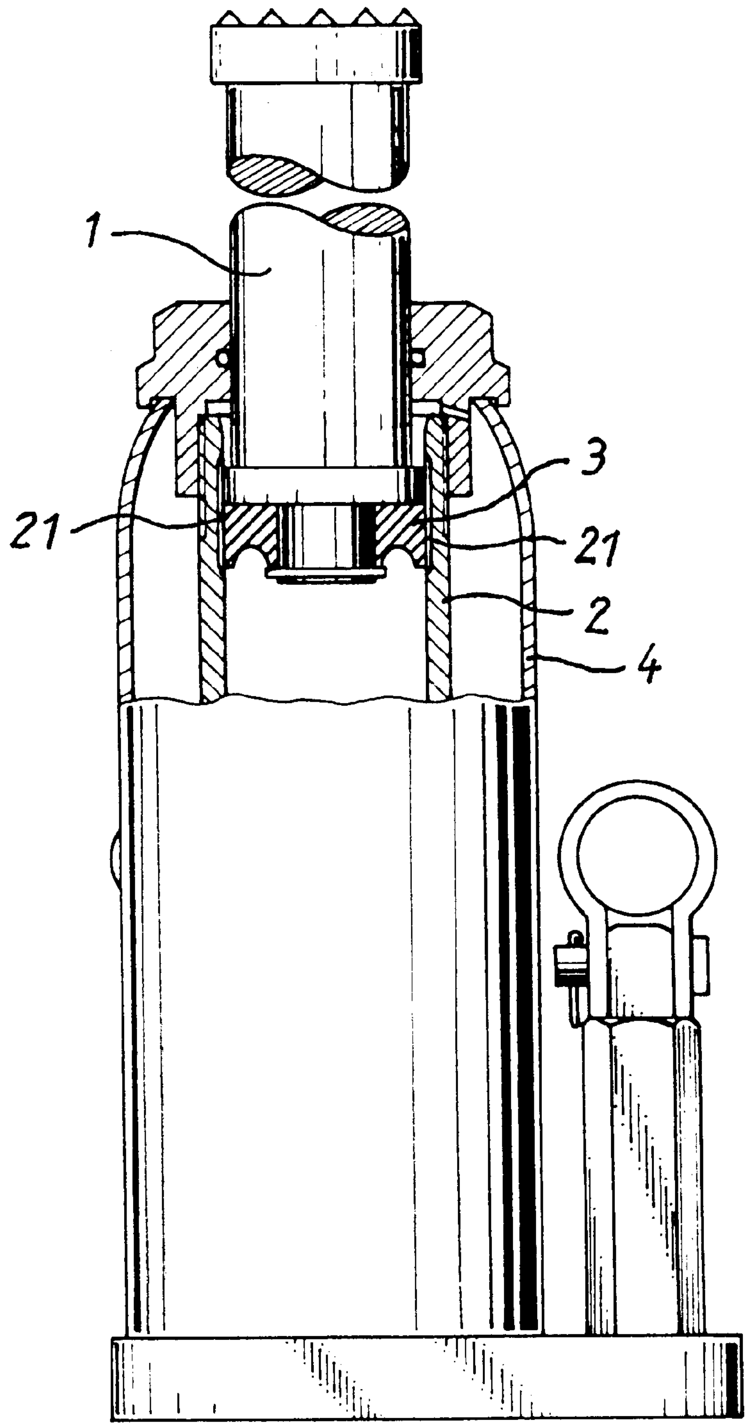
FIG. 1 is a sectional assembly view of a hydraulic cylinder constructed according to the present invention.
Figure 2:
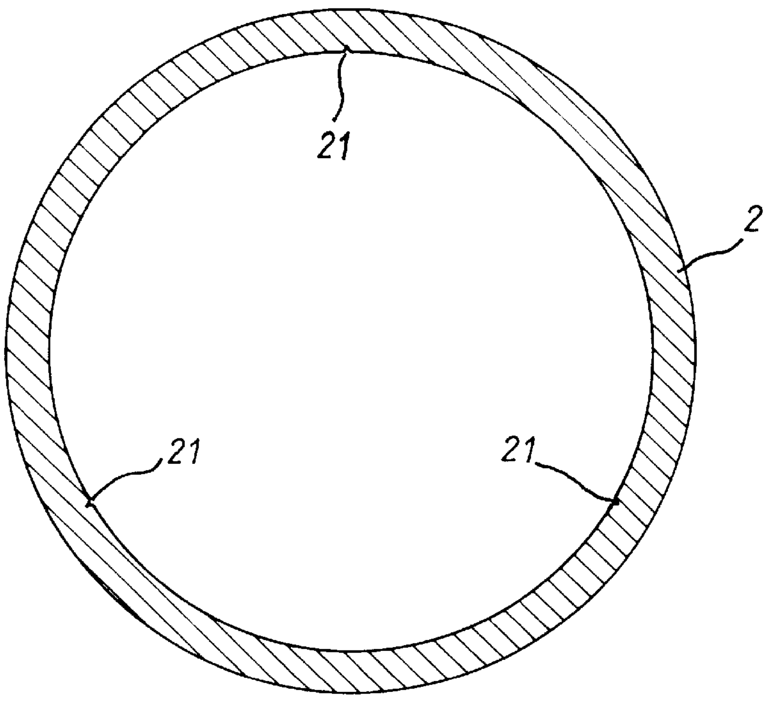
FIG. 2 is a cross sectional view in an enlarged scale of the inner cylinder shown in FIG. 1, showing three V-shaped oil return grooves equiangularly spaced within the inner cylinder.
Figure 3:
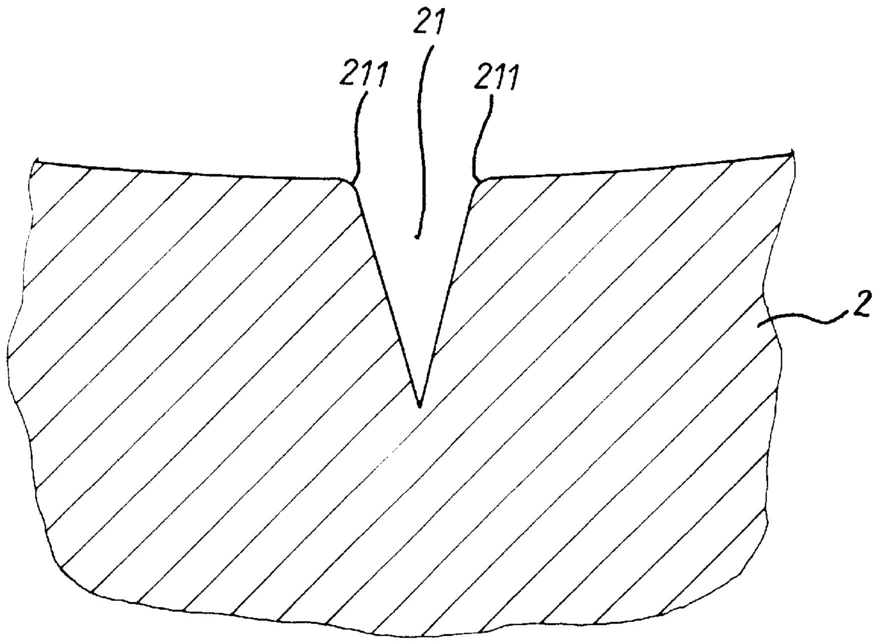
FIG. 3 is an enlarged view of a part of FIG. 2, showing the smoothly arched chamfered edges of the V-shaped oil return groove integral with the inside wall of the inner cylinder.

Referring to FIGS. 1, 2 and 3, a hydraulic jack is shown comprised of an outer cylinder 4, an inner cylinder 2 mounted within the outer cylinder 4, a piston rod 1 movable in and out of the inner cylinder 2, and an oil seal ring 3 mounted around the piston of the piston rod 1 within the inner cylinder 2. At least two, for example three, equiangularly spaced oil return grooves 21 are provided at the inside wall of the inner cylinder 2 near the top end. Each oil return groove 21 has a V-shaped cross section, and two smoothly arched chamfered edges 211 at the connecting areas between the oil return groove 21 and the inside wall of the inner cylinder 2. Because the V-shaped oil return grooves 21 have smoothly arched chamfered edges 211, reciprocating the piston rod 1 does not causes the oil seal ring 3 to wear.

When the piston rod 1 is extended out, the V-shaped oil return grooves 21 impart or form oil return passage for guiding saturated hydraulic oil from the inner cylinder 2 to the outer cylinder 4 to prevent an explosion of the hydraulic cylinder due to an overload. Because the V-shaped oil return grooves 21 have smoothly arched chamfered edges 211, the oil seal ring 3 is moved back and forth over the smoothly arched chamfered edges 211 when the piston rod 1 is reciprocated, and less friction is produced between the inside wall of the inner cylinder 2 and the oil seal ring 3. Therefore, the aforesaid design enables the oil seal ring 3 to be smoothly moved with the piston rod 1 back and forth in the inner cylinder 2, and as a result the service life of the oil seal ring 3 is greatly prolonged.

What the invention claimed is:

1. A hydraulic cylinder comprising:

an outer cylinder;

an inner cylinder disposed in said outer cylinder and having a plurality of equiangularly spaced V-shaped oil return grooves formed in an inner peripheral wall of said inner cylinder, each of said oil return grooves having two smoothly arched chamfered edges at transition areas between said groove and said inner peripheral surface of said inner cylinder; and a piston rod reciprocally mounted in said inner cylinder, wherein said oil return grooves define an oil return loop for guiding saturated hydraulic oil from said inner cylinder to said outer cylinder when said piston rod is extended outwardly of said inner cylinder.

2. A hydraulic cylinder as claimed in claim 1, wherein said V-shaped oil return grooves are disposed only in an upper portion of said inner cylinder.

3. A hydraulic cylinder as claimed in claim 1, further comprising an oil seal ring disposed on an outer peripheral surface of a piston connected to an inner end of said piston rod, wherein said oil seal ring is movable over said smoothly arched chamfered edges of said oil return grooves when said piston rod is reciprocated relative to said inner cylinder.

4. A hydraulic cylinder as claimed in claim 1, wherein said outer cylinder and said inner cylinder are fixed relative to each other.

* * * * *